(12) United States Patent
Bae

(10) Patent No.: US 11,687,624 B2
(45) Date of Patent: *Jun. 27, 2023

(54) CONTENTS BLOCKCHAIN PLATFORM

(71) Applicant: Whoborn, Inc., Seoul (KR)

(72) Inventor: Young Sik Bae, Seoul (KR)

(73) Assignee: Whoborn, Inc., Seoul (KR)

( * ) Notice: Subject to any disclaimer, the term of this patent is extended or adjusted under 35 U.S.C. 154(b) by 122 days.

This patent is subject to a terminal disclaimer.

(21) Appl. No.: 17/146,088

(22) Filed: Jan. 11, 2021

(65) Prior Publication Data

US 2021/0133296 A1  May 6, 2021

Related U.S. Application Data

(63) Continuation of application No. 16/653,064, filed on Oct. 15, 2019, now Pat. No. 10,922,384, which is a continuation of application No. PCT/KR2018/016615, filed on Dec. 26, 2018.

(30) Foreign Application Priority Data

Aug. 17, 2018 (KR) ........................ 10-2018-0096219
Nov. 23, 2018 (KR) ........................ 10-2018-0146724

(51) Int. Cl.
| | |
|---|---|
| *G06F 21/10* | (2013.01) |
| *G06F 21/60* | (2013.01) |
| *H04L 9/08* | (2006.01) |
| *H04L 9/06* | (2006.01) |
| *H04L 9/32* | (2006.01) |
| *H04L 9/00* | (2022.01) |

(52) U.S. Cl.
CPC ............ *G06F 21/10* (2013.01); *G06F 21/602* (2013.01); *H04L 9/0637* (2013.01); *H04L 9/0866* (2013.01); *H04L 9/3234* (2013.01); *G06F 2221/0755* (2013.01); *H04L 9/50* (2022.05); *H04L 2209/603* (2013.01)

(58) Field of Classification Search
CPC ............. G06Q 30/016; G06Q 30/0641; G06Q 10/06311; G06Q 10/10; G06Q 50/12; G01S 19/13; H04L 67/12; G08B 7/068
See application file for complete search history.

(56) References Cited

U.S. PATENT DOCUMENTS

| | | | | |
|---|---|---|---|---|
| 6,898,791 B1 * | 5/2005 | Chandy | ................... | G06F 9/546 714/15 |
| 2010/0322055 A1 * | 12/2010 | Town | ............... | G11B 20/00086 369/100 |
| 2014/0013420 A1 * | 1/2014 | Picionielli | ............... | H04L 63/04 726/17 |
| 2014/0310519 A1 * | 10/2014 | Yoo | ........................ | H04L 63/062 713/165 |
| 2015/0220881 A1 * | 8/2015 | Geisert | .................. | G06Q 10/10 705/59 |

(Continued)

*Primary Examiner* — Mohammed Waliullah
(74) *Attorney, Agent, or Firm* — United One Law Group LLC; Kongsik Kim; Jhongwoo Peck

(57) ABSTRACT

A platform and method for content management is disclosed. A content right management method includes receiving contents from a user, and generating a create key for a right for the contents by encrypting the contents using encryption information, in which the create key includes a copyright of the contents and a creation right of the contents.

16 Claims, 12 Drawing Sheets

(56) References Cited

U.S. PATENT DOCUMENTS

| | | | |
|---|---|---|---|
| 2016/0070581 A1* | 3/2016 | Soon-Shiong | G06Q 50/10 715/706 |
| 2018/0374173 A1* | 12/2018 | Chen | H04L 9/3236 |
| 2019/0147555 A1* | 5/2019 | Lu | G06Q 40/06 705/310 |

* cited by examiner

1200

CONTENTS BLOCKCHAIN PLATFORM

CROSS-REFERENCE TO RELATED APPLICATIONS

This application is a Continuation of U.S. application Ser. No. 16/653,064 filed Oct. 15, 2019, which is a Continuation of International Application No. PCT/KR2018/016615 filed on Dec. 26, 2018, which claims priority to Korean Application No. 10-2018-0096219 filed on Aug. 17, 2018 and Korean Application No. 10-2018-0146724 filed on Nov. 23, 2018. The aforementioned applications are incorporated herein by reference in their entirety.

TECHNICAL FIELD

Example embodiments relate to a platform and method for content management.

BACKGROUND ART

A variety of digital materials and data is widely used as computer technology develops. Among these digital materials and data, there are numerous confidential materials requiring high-level security and copyrighted materials. A variety of technologies has been proposed to protect these materials.

A technical term, digital rights management (DRM), refers to a systematic approach for a publisher or a copyright holder to restrict use of digital materials or hardware distributed by them, or restrict the use only to the intended purpose. For example, it is used to prevent an unauthorized use of music, movies, and the like distributed offline mainly using a compact disc (CD) or a digital versatile disc (DVD) without making a due payment for use of such contents, and to allow only an authorized user to use such contents only for an authorized period of time. Recently, as importance of security increases and recognition of such increasing importance prevails, it is also used to prevent a leakage of confidential materials or data including business or sales secrets and know-how of an entity.

Recently, blockchain technology is used for DRM. The blockchain technology is a record maintenance technology designed to ensure integrity of a detailed transaction statement in a mutual transaction without an entity guaranteeing the integrity of the transaction. That is, the blockchain technology may employ a mechanism for storing the detailed transaction statement yet prevent the stored statement from being arbitrarily modified. However, the blockchain technology is an element technology irrespective of what is stored in a block database (DB) embodied in a form of chain. For example, electronic or digital money, for example, bitcoins, may be embodied by a blockchain, and thus a ledger including details of a transaction of the money may become a target. However, there may be no restriction on a target to be stored.

Thus, considering characteristics of peer-to-peer (P2P) technology applied to a blockchain or a modification-resistant mechanism provided by a blockchain, suitable data to be stored in a blockchain may be irreversible one that may be seen by a third party but not be modified. A general example of this is a ledger described in the foregoing.

SUMMARY

According to an example embodiment, there is provided a content right management method including receiving contents from a user, and generating a create key for a right for the contents by encrypting the contents using encryption information. The create key may include a copyright of the contents and a creation right of the contents.

The creation right of the contents may include a right to create encrypted contents and a right to create a coin. The coin may be a right to access the contents.

The encryption information may be bioinformation of the user.

The generating of the create key may include generating a number of create keys based on a number of owners possessing the contents.

The content right management method may further include transferring the create key. Through the transferring, at least one of the copyright of the contents or the creation right of the contents may be transferred.

When the create key is transferred to a person who is not an inheritor, only the copyright of the contents may be transferred.

When the create key is transferred to an inheritor, the content right management method may further include generating a new create key using bioinformation of the inheritor.

The content right management method may further include creating the encrypted contents and the coin in response to the create key being generated.

The creating of the encrypted contents and the coin may include creating the encrypted contents and the coin using the bioinformation of the user in response to the create key being generated.

The number of coins to be created may be set based on a usage right option for a period of use of the contents.

The content right management method may further include accessing the encrypted contents using the coin.

The content right management method may further include returning the coin based on information on the usage right option for the period of the use of the contents, the information being included in the coin.

One of the encrypted contents and the coin may include a reproduction program or a reproduction module.

DETAILED DESCRIPTION

Figure 1A:
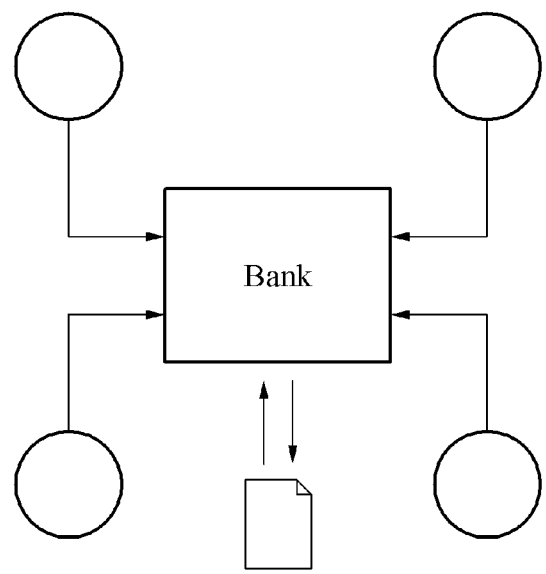
FIGS. 1A and 1B are diagrams illustrating an example of blockchain technology.

Hereinafter, example embodiments will be described with reference to the accompanying drawings. However, various changes, modifications, and equivalents of the methods, apparatuses, and/or systems described herein will be apparent after an understanding of the disclosure of this application. The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to be limiting the present disclosure. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

A term "tool" used herein may indicate hardware configured to perform functions and operations of respective components described herein, a computer program code configured to perform specific functions and operations, or an electronic recording medium, for example, a processor and a microprocessor, that is equipped with a computer program code enabling specific functions and operations to be performed.

That is, the term "tool" may indicate hardware used to perform or achieve technical features of the present disclosure, and/or a functional and/or structural combination of software to drive or operate the hardware.

Figure 1B:
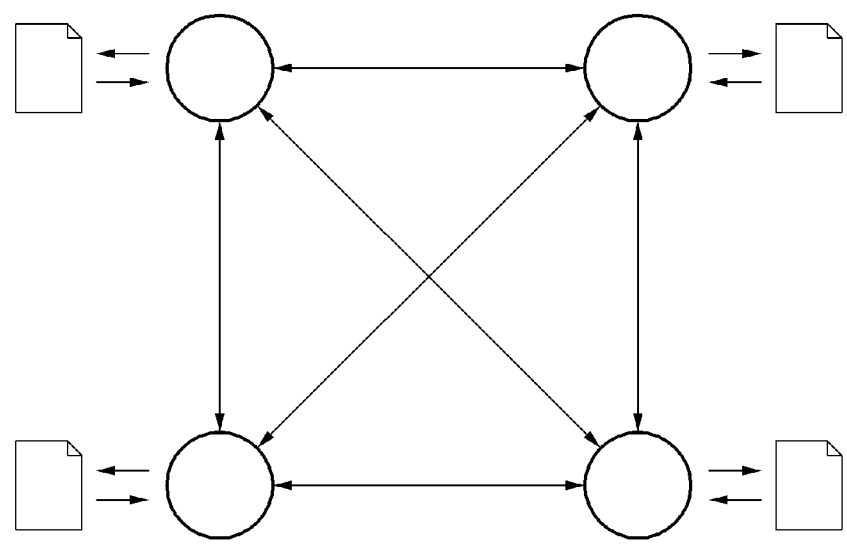

FIGS. 1A and 1B are diagrams illustrating an example of blockchain technology.

FIG. 1A is a diagram illustrating an example of a centralized transaction recording method, and FIG. 1$b$ is a diagram illustrating a distributed transaction recording method using a blockchain.

Herein, a blockchain refers to a distributed database (DB) that continuously grows as a new block is added at each preset interval. Each of blocks included in a blockchain may have a unique identifier based on a sequence number in which each block is generated.

A blockchain may also indicate an autonomous, distributed, open, shared ledger. For example, a bitcoin may be used to record a transaction in a shared ledger using blockchain technology.

Referring to FIG. 1A, a central server of the centralized transaction recording method may be used in a bank, a mart, a store, and the like, and configured to record and manage transaction details transmitted from various points using a single DB. Through the centralized transaction recording method, transaction details, histories, and the like may be managed in a single DB, which is not an open record book, and thus records in the DB may be manipulated or concealed internally. For example, when the central server is hacked, all the records stored in the DB may be manipulated all at once.

Referring to FIG. 1B, in the distributed transaction recording method, each of unspecified individual devices may function as a distributed server. The distributed server may collect transaction details broadcasted on a network, retrieve a hash of a new block satisfying a predetermined condition based on a hash of a lastly generated block on a blockchain, and obtain a right to generate the new block. Herein, a plurality of distributed servers may monitor one another. There is no device predetermined to generate a blockchain, and an unspecified plurality of devices may verify validity of blockchains connected thereto. Thus, even when records are manipulated in a distributed server or a distributed server is hacked, validity of a corresponding blockchain of the distributed server may be excluded by other distributed servers on a network.

Figure 2:
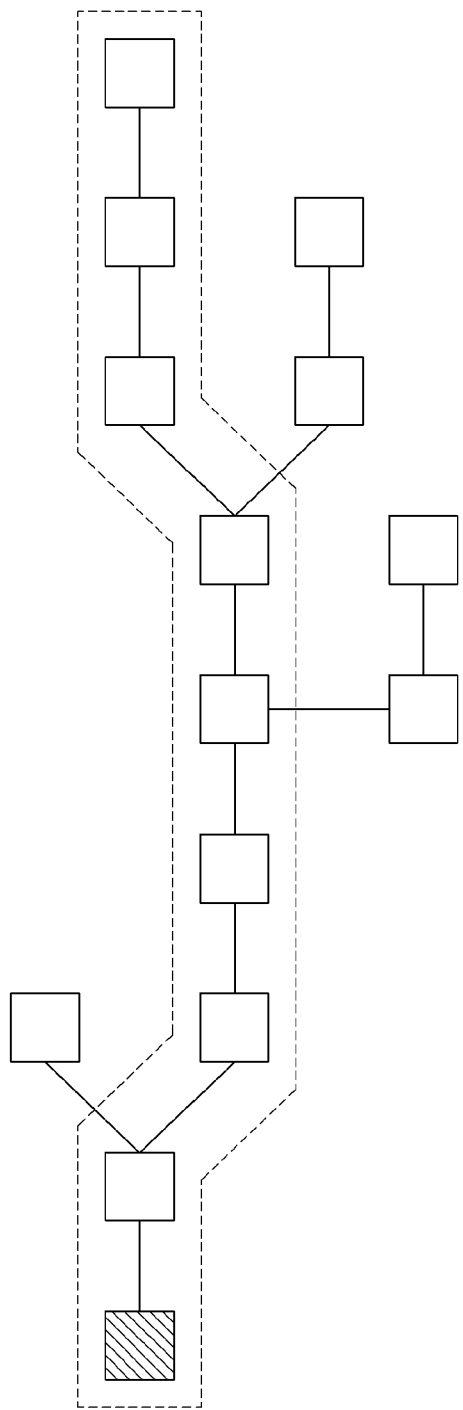
FIG. 2 is a diagram illustrating an example of a time-series blockchain connection.

FIG. 2 is a diagram illustrating an example of a time-series blockchain connection.

A block included in a blockchain may be generated in a predetermined time unit. Herein, it is necessary to calculate or obtain a hash satisfying a predetermined condition based on a hash of a previous block in a time series in order to generate a new block.

A plurality of blocks included in a blockchain may be connected in a time series. Herein, a hash function indicates a function that may perform a calculation in one direction from an input to an output, but not perform or have a difficulty in performing a calculation in an inverse direction from the output to the input. A method of substitution may be used to derive an input value of the hash function. Through such a substitution method, a desired output may be derived by substituting various inputs, and thus an amount of time used to derive an input under a corresponding condition may be determined variously based on a level of difficulty of a condition to be satisfied.

The hash function may have a level of difficulty at which a hash is calculated in response to a period in which a blockchain is generated, for example, 10 minutes. A hash may be determined to be a value that satisfies a condition using a hash of a previous block and a transaction, or transaction details, newly generated after the previous block. An unspecified plurality of devices may calculate or obtain a hash of a blockchain. For example, when a certain device calculates and obtains a hash, a block including the hash in a header may be newly generated, and the block may be added to a blockchain.

When the new block is generated, the devices may initiate a calculation to calculate or obtain a hash of a next block based on a corresponding time. When the hash is calculated or obtained, a device calculating the hash may generate another next block including the hash in a header. Herein, blocks included in a blockchain may include different hashes.

As illustrated in FIG. 2, blockchains generated based on a predetermined period may be connected in a time series, and two or more blockchains may be generated at a similar point in time. In such a case, only blocks forming a longest chain from an initial block may be recognized as a valid blockchain, and converge into a single blockchain.

Figure 3:
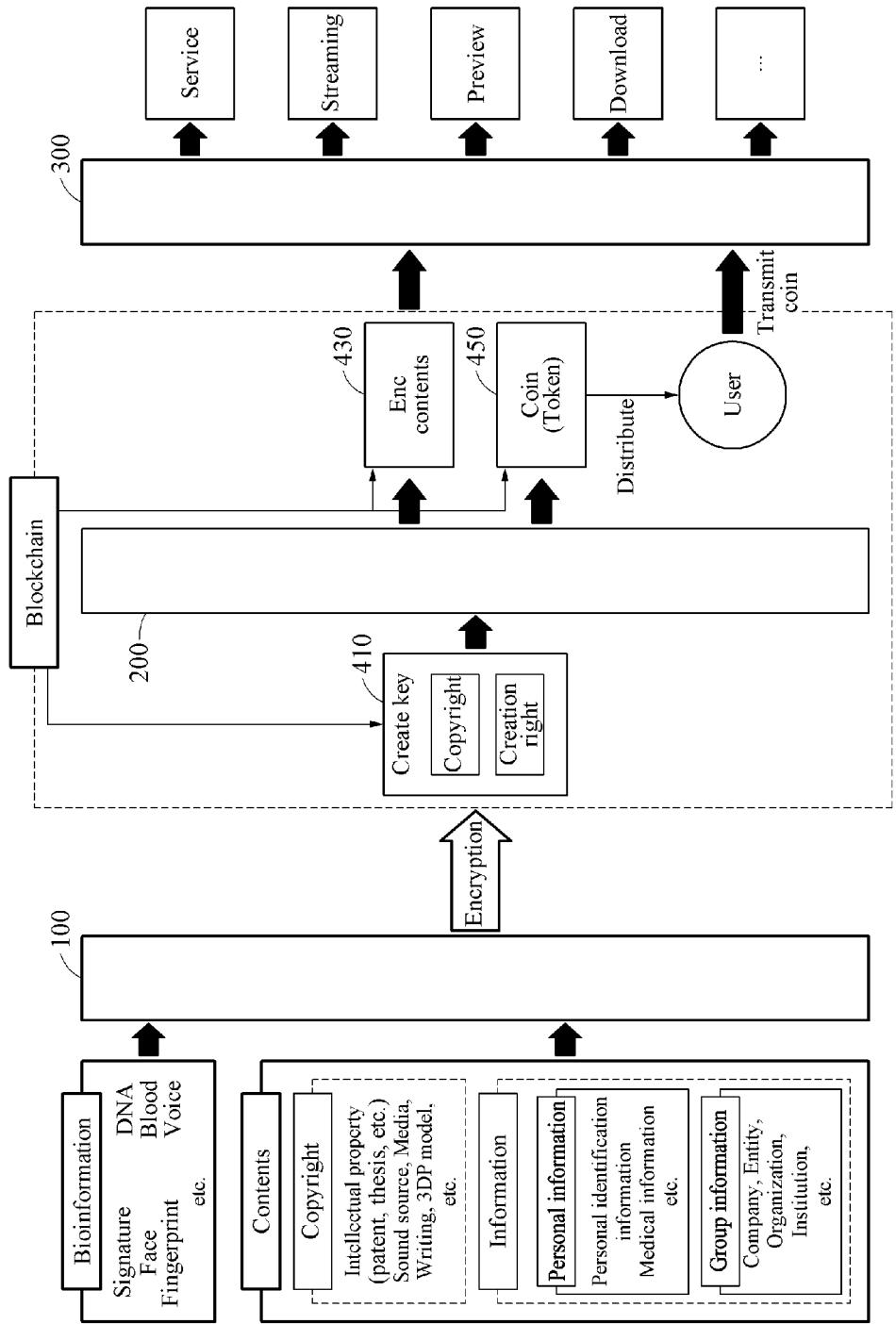
FIG. 3 is a diagram illustrating an example of a content management platform according to an example embodiment.
Figure 4:
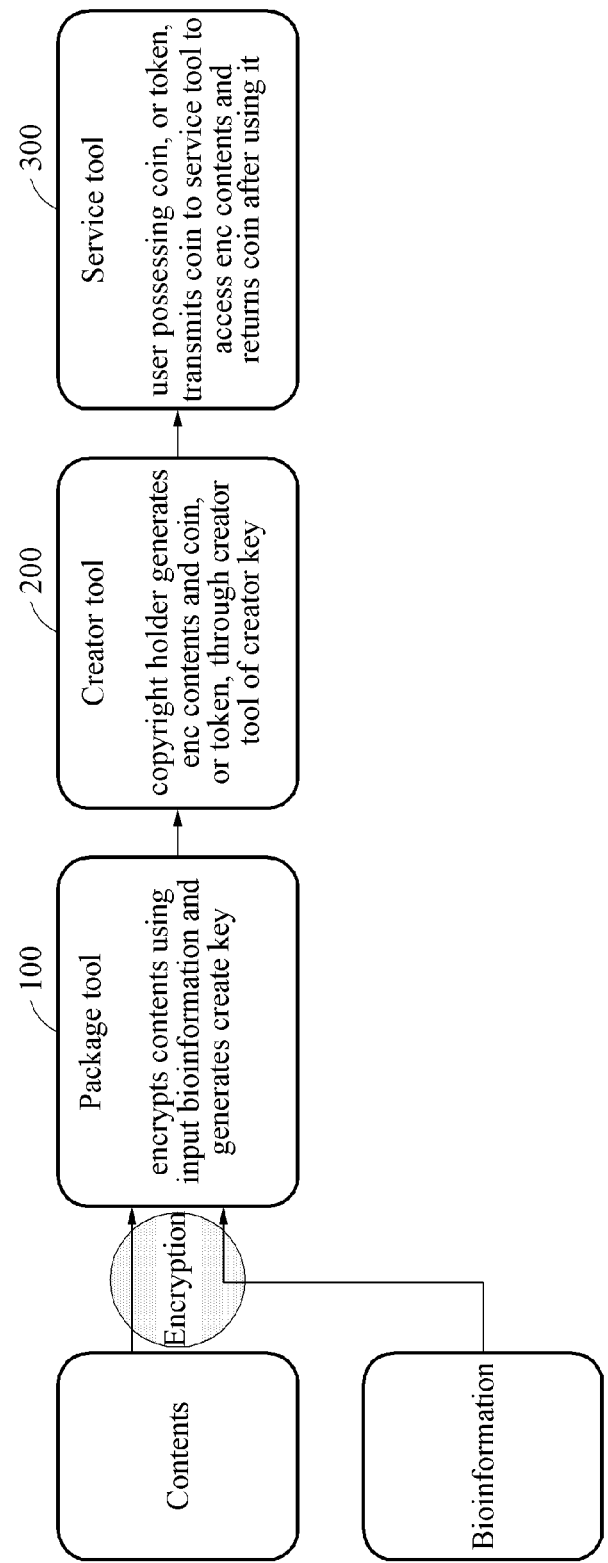
FIG. 4 is a diagram illustrating an example of a process performed in a content management platform illustrated in FIG. 3.

FIG. 3 is a diagram illustrating an example of a content management platform according to an example embodiment. FIG. 4 is a diagram illustrating an example of a process performed in a content management platform illustrated in FIG. 3.

Referring to FIGS. 3 and 4, a content management platform 10 includes a package tool 100, a creator tool 200, and a service tool 300. The content management platform 10 is configured to manage a copyright of contents, for example, digital contents, using a blockchain.

Herein, contents may indicate copyrighted contents, information contents, and the like. The copyrighted contents may include contents, for example, an intellectual property (e.g., patent, trademark, design, and the like), a sound source, media, a piece of writing or an article, and a three-dimensional (3D) modeling file. The information contents may include contents, for example, personal information (e.g., medical information, personal identification information, and the like), and group information (e.g., company, entity, organization, institution, and the like). As described above, contents may include various contents generated by humans, and a copyright of contents may include a unique right for a person generating the contents in addition to a traditional concept of copyright.

The package tool 100 may receive contents from a user generating the contents. The package tool 100 may generate a create key 410 for a right of the contents by encrypting the contents input from the user using encryption information.

The encryption information may include a combination of at least one of bioinformation of the user, a private key, a character, and a symbol. The bioinformation may include biometric information unique to the user, for example, a signature, DNA, a face, blood or blood vessels, a fingerprint, and a voice of the user. In a case in which the encryption information includes a combination of two or more of what is described in the foregoing, the bioinformation may be included in this encryption information without fail.

The create key 410 may include a copyright of the contents and a creation right of the contents. The creation right of the contents may include a right to create encrypted contents 430 (or enc contents as illustrated) and a right to create a coin 450. That is, an owner possessing the create key 410 may have an ownership of the copyright of the contents, and the creation right to create the encrypted contents 430 and the coin 450.

In addition, the package tool 100 may generate a number of create keys 410 based on a number of owners possessing the contents. Herein, a single create key may be generated for the contents, and also a plurality of create keys may be generated based on the number of owners possessing the contents. For example, when a plurality of create keys is generated, a plurality of owners may have respective divided shares of the copyright of the contents. In this example, the owners may need to participate in a decision-making process for the contents when needed.

The create key 410 may be transferable. When the create key 410 is transferred, at least one of the ownership of the copyright or the creation right of the contents may be selected to be transferred.

Herein, when the user creating the contents, or a copyright holder of the contents passes away, the copyright of the contents may be transferred to an inheritor and the create key 410 generated based on the bioinformation of the user creating the contents may be set to be generated as a new create key based on bioinformation of the inheritor. That is, the inheritor may generate the new create key using the bioinformation of the inheritor and may thus have the copyright of the contents.

The creator tool 200 may create the encrypted contents 430 and/or the coin 450 in response to the create key 410 being generated.

The encrypted contents 430 may be stored in a blockchain or a separate dedicated content server. In addition, the encrypted contents 430 may be embedded in the coin 450.

The coin 450 indicates a usage right enabling access to the contents, for example, a token. A valid period of use of the coin 450 may be classified into a sample use period, a finite use period, an infinite use period, and the like. The coin 450 may be distributed or sold to a user who desires to use the contents, or a user who is not the copyright holder. An owner of the coin 450 may use the contents using the coin 450.

In addition, the creator tool 200 may create the encrypted contents 430 and the coin 450 and set a number of pieces of encrypted contents and coins to be created based on bioinformation of an owner of the create key 410. That is, the creator tool 200 may need the bioinformation of the owner to set the number of the pieces of encrypted contents and the coins to be created.

The creator tool 200 may be embedded in the create key 410.

Herein, when the create key 410 is transferred to another user, bioinformation of a previous owner (or a transferor) of the create key 410 may not be transferred to the other user (or a transferee). After the create key 410 is transferred, the creator tool 200 may not additionally generate the encrypted contents 430 and the coin 450.

The service tool 300 may access the encrypted contents 430 using the coin 450. The service tool 300 may be, for example, a service provider platform enabling access to the encrypted contents 430.

The owner of the coin 450 may transmit the coin 450 to the service tool 300 to use the encrypted contents 430, and receive the coin 450 back after using it.

The create key 410, the encrypted contents 430, and the coin 450 may be stored in a blockchain. Herein, a blockchain may be present for each piece of contents input by a user. The blockchain may include an ordered data block sequence that stores therein information on the user and the contents.

For example, when a user initially inputs contents and a create key is generated in the package tool 100, a blockchain may include a genesis block that stores therein the create key and information on an owner of the contents, or a copyright holder of the contents. When a usage right of the contents is acquired, a new subsequent block may be added to the blockchain. Herein, each of new subsequent blocks to be added may indicate each usage right of the contents.

Alternatively, the create key 410, the encrypted contents 430, and the coin 450 may be individually configured in a form of packaged storage data similar to a blockchain or other applications of other security technology different from the blockchain, without applying the same technology to them.

Figure 5:
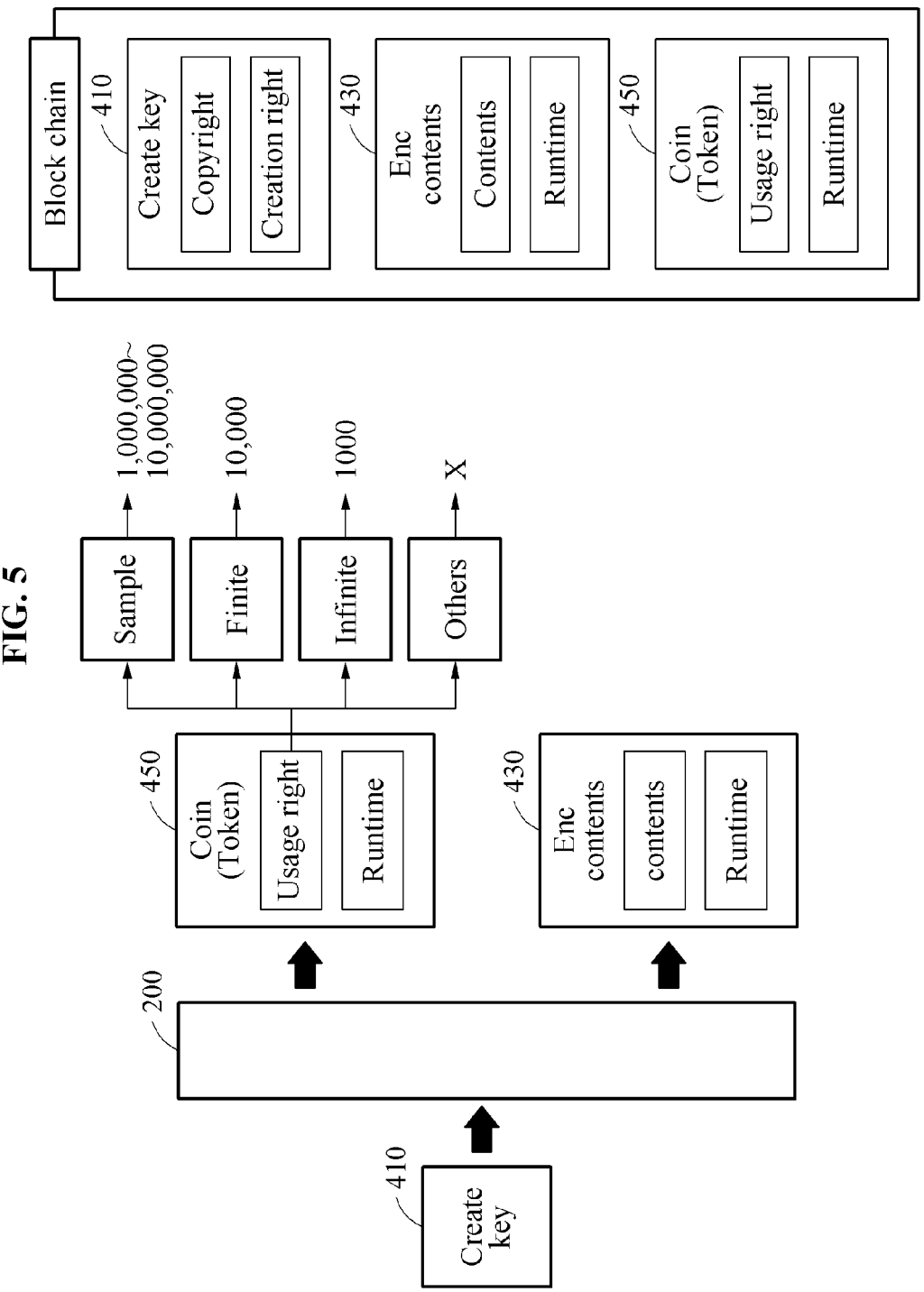
FIG. 5 is a diagram illustrating an example of how a creator tool illustrated in FIG. 3 creates a coin and encrypted contents.

FIG. 5 is a diagram illustrating an example of how a creator tool illustrated in FIG. 3 creates a coin and encrypted contents.

In response to the create key 410 being generated, the creator tool 200 may create the coin 450 using bioinformation of an owner of the create key 410. The creator tool 200 may set a number of coins to be created based on a usage right option for a valid period of use of contents to create the coins.

Herein, a usage right option for the coin 450 may be classified into sample use (e.g., preview), use for a finite period (e.g., a limited number of times for use of the contents or a limited period of time for use of the contents, ten times of use, one-month use, and the like), use for an infinite period (e.g., an unlimited number of times for use of the contents, a complete purchase of the contents, an ownership of the contents, and the like), and other uses.

For example, the number of coins to be created may be set to be A for the sample use, B for the use for the finite period, C for the use for the infinite period, and D for the other uses. In this example, A may be 100 to 1000, B may be 10000, C may be 1000, and D may be an arbitrary number.

A user creating the contents, or a copyright holder of the contents, may restrict a number of coins to be distributed to other users through the creator tool 200.

Thus, the number of users allowed to access the contents may be restricted, and the contents may be classified into premium contents and general contents based on an added value. Thus, it is possible to readily monitor a distribution status of the contents and prevent an illegal distribution of the contents.

In addition, in response to the create key 410 being generated, the creator tool 200 may generate the encrypted contents 430 using the bioinformation of the owner of the create key 410.

The creator tool 200 may set a number of pieces encrypted contents to be created based on an operation mode of the encrypted contents 430, and create the set number of the encrypted contents 430. The operation mode may include a quantity limiting mode and a public mode. For example, when the encrypted contents 430 is operated in the quantity limiting mode, the creator tool 200 may generally create one encrypted content. However, in this example, the creator tool 200 may create ten encrypted contents to operate ten dedicated content servers, in lieu of one content server, based on connected users.

Figure 6:
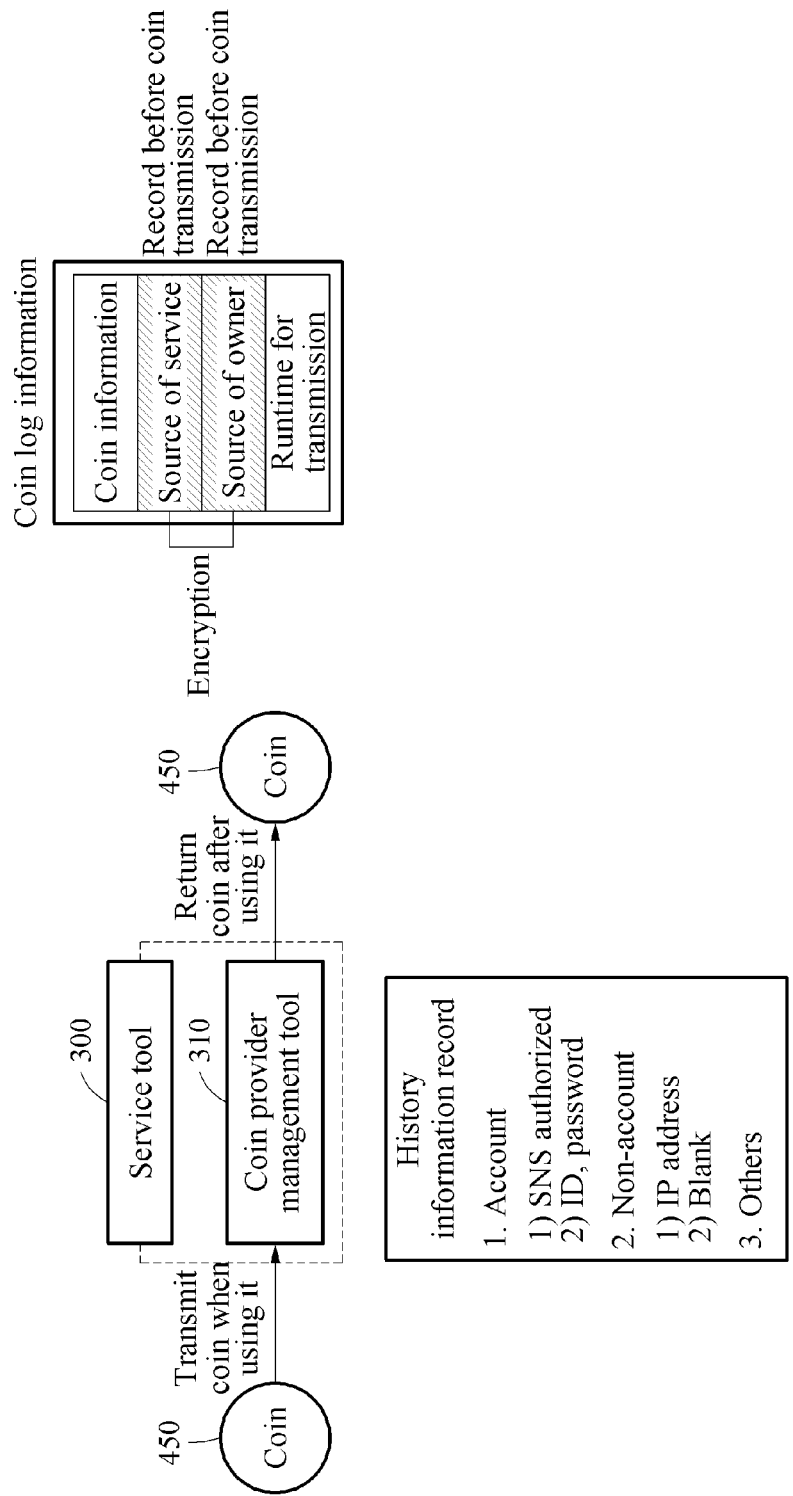
FIG. 6 is a diagram illustrating an example of a process performed by a service tool illustrated in FIG. 3.

FIG. 6 is a diagram illustrating an example of a process performed by a service tool illustrated in FIG. 3.

The service tool 300 may provide a service enabling access to the encrypted contents 430 using the coin 450, and return the coin 450 after the service is terminated.

A user possessing the coin 450 may access a content server in which the encrypted contents 430 is stored, and access the encrypted contents 430 when the coin 450 is transmitted.

For example, the service tool 300 may receive the coin 450 from the user possessing the coin 450, and allow the user to access the encrypted contents 430 using the coin 450. That is, the service tool 300 may transmit the encrypted contents 430 to the user possessing the coin 450. The contents included in the encrypted contents 430 may be reproduced or played in various ways by a runtime program, for example, a player, that is included in the encrypted contents 430.

The coin 450 may include coin log information. The coin log information may include coin information (e.g., coin identification information), information on a service location (e.g., a coin receiver and a service provider), and information on an ownership location (e.g., a coin owner), and the like. The service location and the ownership location may be encrypted to be stored. Herein, for such encryption, bioinformation of the owner of the coin 450 may be used.

The coin information may be coin identification information used to identify the coin 450. The service location may be a location of a service provider providing the encrypted contents 430 corresponding to the coin 450. The service location may be limited as being allowed or allocated only to a few service providers, but may also be determined to be infinite. The ownership location may be a location of the user possessing the coin 450, for example, a location at which the coin 450 is stored after being purchased and transmitted initially.

The coin log information may further include information on a usage right option. The information on the usage right option may be separately managed in the coin log information and may also be included in the coin information and managed therein.

The coin 450 may be transmitted to the service tool 300, and then results of all transactions made using the coin 450 may be applied to update the coin log information. When the coin 450 is transmitted to the service tool 300 to be used, the runtime program included in the coin 450 or the service tool 300 receiving the coin information may count a number of uses and the counted number may be updated onto the information on the usage right option.

The service tool 300 may return the coin 450 to the user transmitting the coin 450 based on the coin log information and a history information record. The service tool 300 may include a coin provider management tool 310 to manage the coin 450 transmitted from the user of the coin 450. The coin provider management tool 310 may record history information (e.g., access history information) of the user of the coin 450. For example, the history information may include a service location of a service provider providing the encrypted contents 430, and a current ownership location of the user transmitting the coin 450.

The coin provider management tool 310 may determine whether to return the coin 450 based on the usage right option. The coin provider management tool 310 may use the information on the usage right option included in the coin log information as it is, but separately record the information on the usage right option of the coin 450 and apply a number of uses to manage it. For example, when there is a remaining number of uses of the coin 450, the coin provider management tool 310 may return the coin 450 to the current ownership location of the user of the coin 450 based on the history information record, or return the coin 450 to the ownership location stored in the coin log information based on the coin log information.

Herein, information on a transaction associated with use of the coin 450 and related information of the coin 450, for example, the coin log information, may be stored in a corresponding blockchain.

Figure 7:
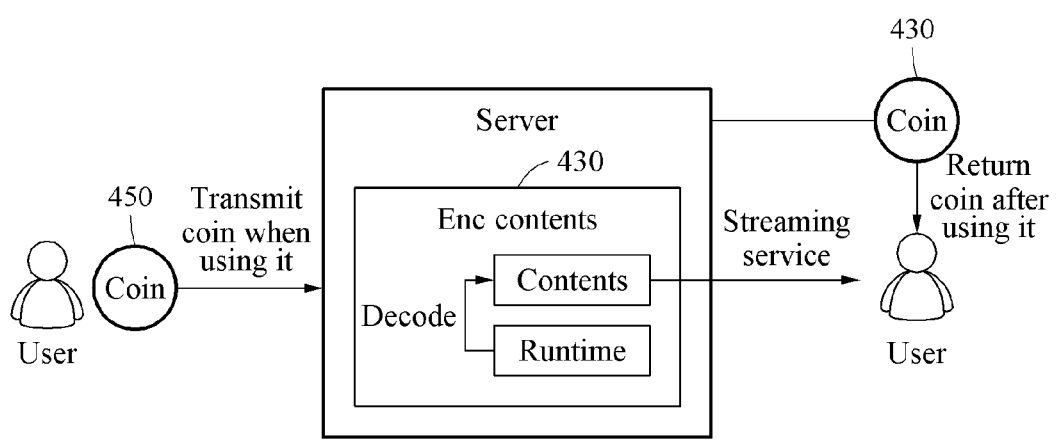
FIG. 7 is a diagram illustrating an example of how to use encrypted contents according to an example embodiment.

FIG. 7 is a diagram illustrating an example of how to use encrypted contents according to an example embodiment.

FIG. 7 illustrates a content streaming method employed to use encrypted contents. Through the content streaming method, a user possessing the coin 450 may access a content server in which the encrypted contents 430 is stored and use the encrypted contents 430 using the coin 450.

The user may access the content server having the encrypted contents 430 through the service tool 300, and use the encrypted contents 430 using the coin 450. The content streaming method may be a method using encrypted contents. A runtime program, for example, a player, included in the encrypted contents 430 may decode the encrypted contents 430 and provide the user with contents obtained through the decoding. The contents may be provided to the user through a content streaming service.

Figure 8:
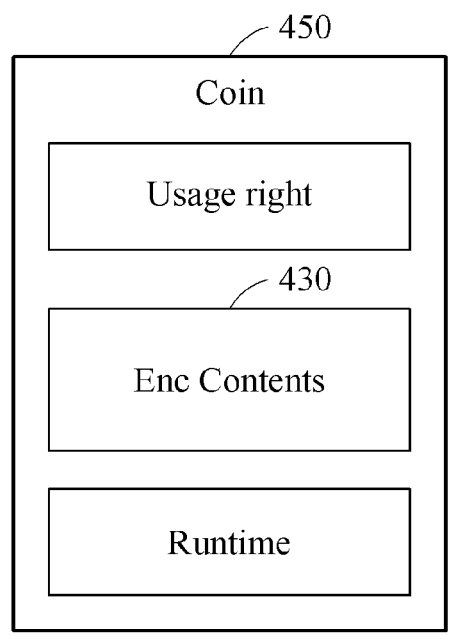
FIG. 8 is a diagram illustrating another example of how to use encrypted contents according to an example embodiment.

FIG. 8 is a diagram illustrating another example of how to use encrypted contents according to an example embodiment.

FIG. 8 illustrates a content coin embedding method employed to use encrypted contents. The content coin embedding method may store the encrypted contents 430 in the coin 450, and reproduce or play it.

The coin 450 may include the encrypted contents 430 and a runtime program. The runtime program may reproduce or play the encrypted contents 430.

To reproduce or play contents, various types of method, for example, a method using an autonomous reproduction program or a module-type decoding program that provides the contents to an external reproduction program, may be used.

Figure 9:
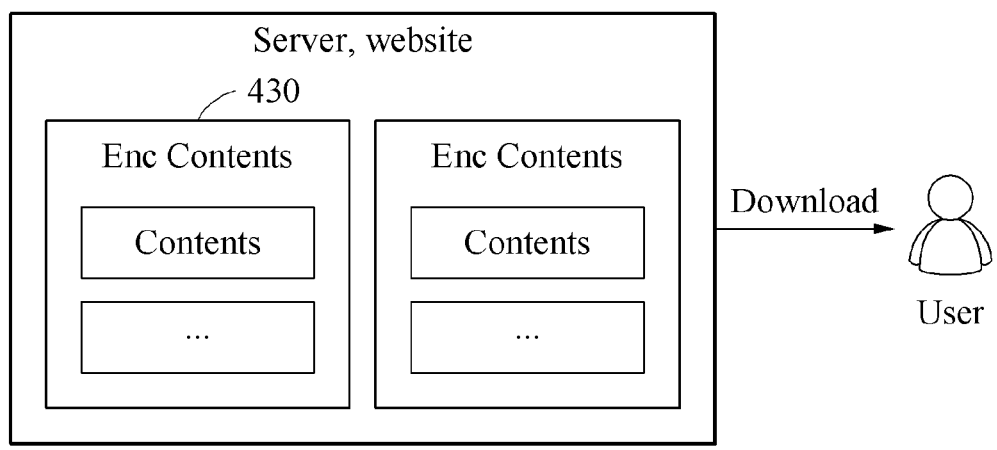
FIG. 9 is a diagram illustrating still another example of how to use encrypted contents according to an example embodiment.

FIG. 9 is a diagram illustrating still another example of how to use encrypted contents according to an example embodiment.

FIG. 9 illustrates a service downloading method, or a content downloading method, that is employed to use encrypted contents. Through the service downloading method, an owner possessing the coin 450 may access a content server in which the encrypted contents 430 is stored therein, download the encrypted contents 430 from the server or a corresponding website, and locally reproduce or play the encrypted contents 430.

Figure 10A:
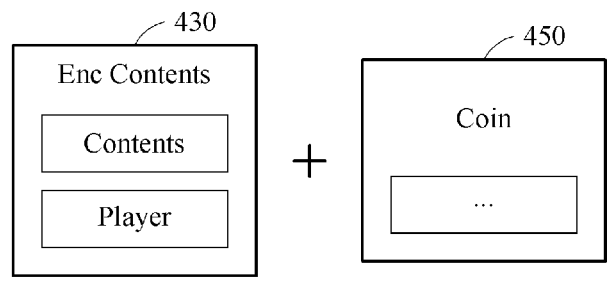
FIGS. 10A through 10C are diagrams illustrating examples of how to reproduce encrypted contents as illustrated in FIG. 9.
Figure 10B:
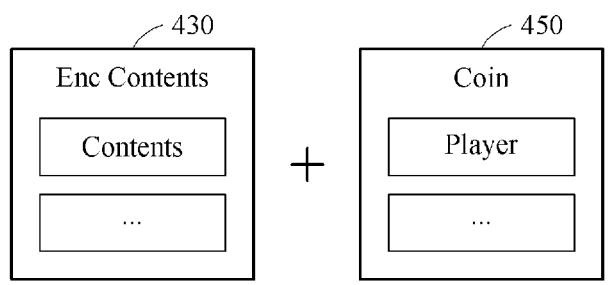
Figure 10C:
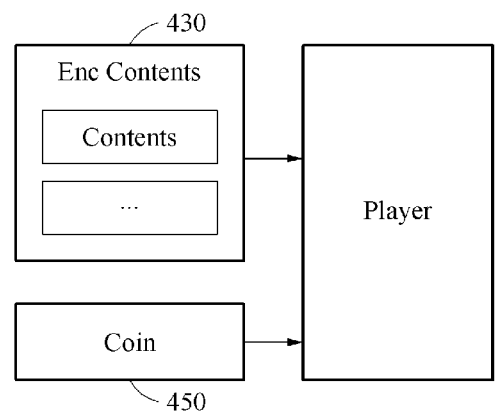

FIGS. 10A through 10C are diagrams illustrating examples of how to reproduce or play encrypted contents as illustrated in FIG. 9.

FIG. 10A illustrates a reproduction method in which a player is included in the encrypted contents 430. Referring to FIG. 10A, the encrypted contents 430 includes the player. The player reproduces or plays contents included in the encrypted contents 430 using the coin 450.

FIG. 10B illustrates a reproduction method in which a player is included in the coin 450. Referring to FIG. 10B, the coin 450 includes the player. The player included in the coin 450 reproduces or plays contents included in the encrypted contents 430.

FIG. 10C illustrates a reproduction method using a dedicated player. Referring to FIG. 10C, the dedicated player reproduces or plays contents using the coin 450 and the encrypted contents 430. The dedicated player receives the coin 450 and the encrypted contents 430, and reproduces the contents included in the encrypted contents 430 using the coin 450.

The player illustrated in FIGS. 10A, 10B, and 10C may indicate a runtime program, and the reproduction methods described above may include all different types of method to which the reproduction method described above with reference to FIG. 10A, 10B, or 10C is applied. For example, only when a location of the runtime program is present in each of the coin 450 and the encrypted contents 430 and they interwork, the encrypted contents 430 may be reproduced.

Figure 11:
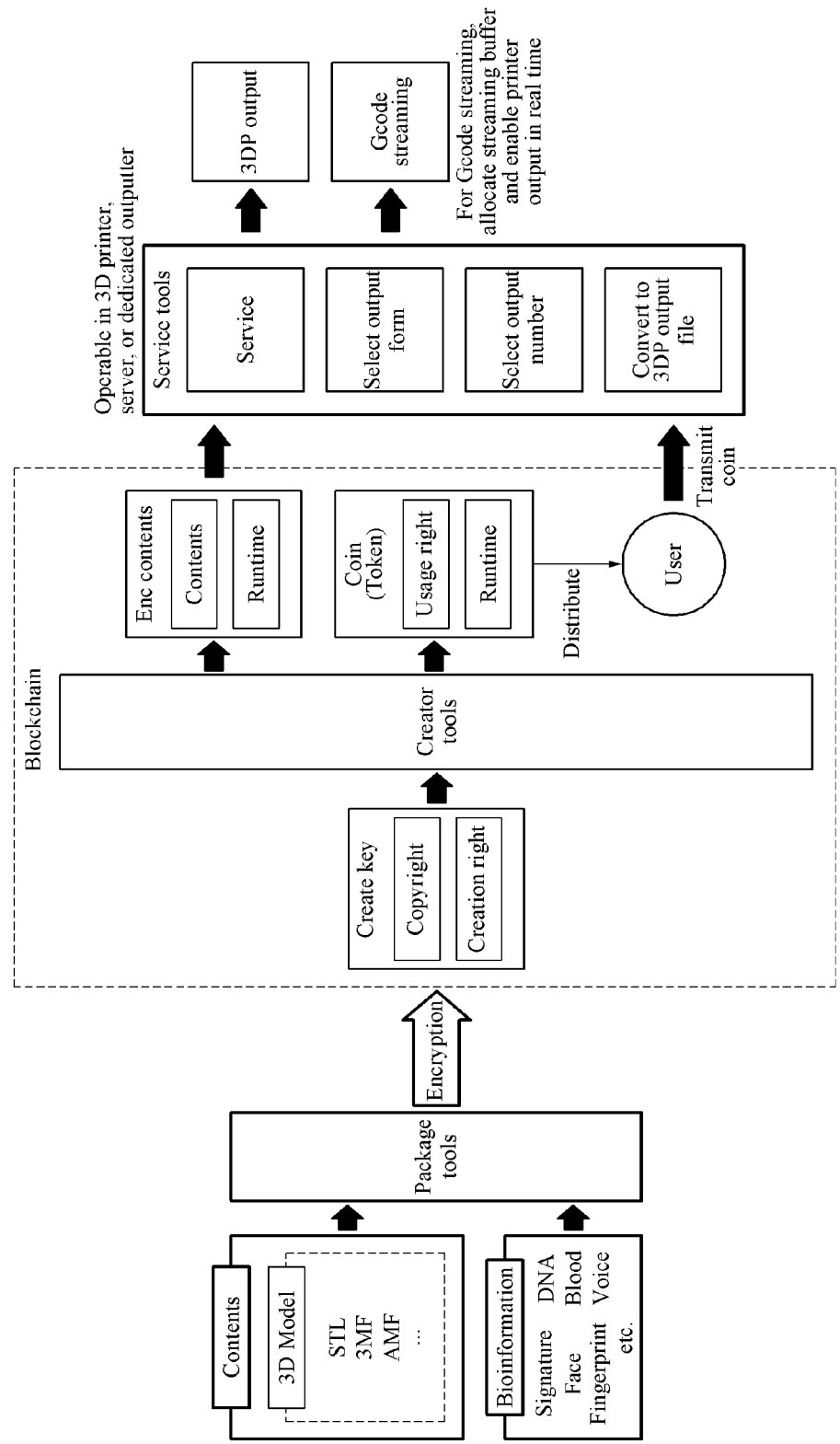
FIG. 11 is a diagram illustrating an example of how a content management platform illustrated in FIG. 3 is used.

FIG. 11 is a diagram illustrating an example of how a content management platform illustrated in FIG. 3 is used.

Referring to FIG. 11, the content management platform 10 may be used in a 3D printer, for example.

To operate a create key, encrypted contents, and a coin, the methods described above may be selectively used, and a service tool may be configured to perform a server operation method, or to operate in the 3D printer to practically restrict outputs. Output data, or data to be printed out, may be packaged on a separate blockchain, and generated and provided as a one-time output file. It is thus possible to prevent an external exposure when outputting it. Herein, this may be restricted to be operated in a specific device.

An output file of the 3D printer may support various formats, for example, a mesh format, a solid format, a G-code format, a stereolithography (STL) format, a 3D manufacturing format (3MF), an additive manufacturing file format (AMF), and the like. In addition, it may support an embedding method of software for output, or an internet service method or an offline plug-in method corresponding to a dedicated software method or a universal software method. For a web streaming service, a web interworking method, a web application server (WAS), a web application (app) method, and the like may be used to provide the service.

Figure 12:
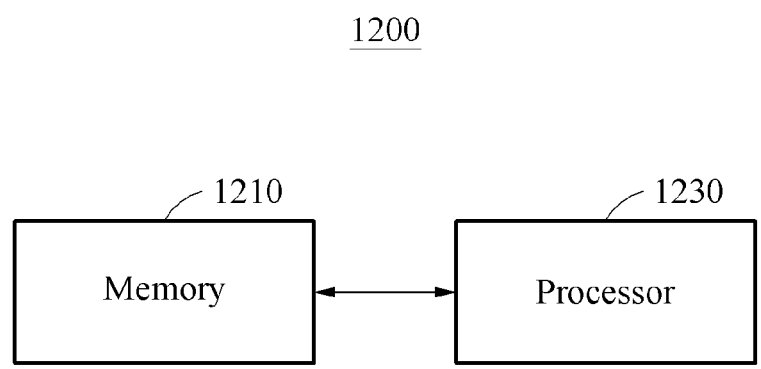
FIG. 12 is a diagram illustrating an example of an electronic device in which a content management platform is implemented according to an example embodiment.

FIG. 12 is a diagram illustrating an example of an electronic device in which a content management platform is implemented according to an example embodiment.

Referring to FIG. 12, an electronic device 1200 includes a memory 1210 and a processor 1230.

At least one of the package tool 100, the creator tool 200, or the service tool 300 described above with reference to FIGS. 1 through 11 may be embodied, installed, or embedded in the electronic device 1200, and implemented by the processor 1230.

The electronic device 1200 may be embodied by, for example, a personal computer (PC), a data server, a 3D printer, a portable device, and the like.

The portable device may be a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal or portable navigation device (PND), a handheld game console, an e-book, a smart device, and the like. The smart device may include a smart watch, a smart band, a smart ring, and the like.

The memory 1210 may store instructions or programs executable by the processor 1230. For example, the instructions may be used to execute operations of at least one of the package tool 100, the creator tool 200, or the service tool 300.

The processor 1230 may control an overall operation of the electronic device 1200. The processor 1230 may be embodied by at least one processor including one or more cores.

The processor 1230 may execute the instructions to execute operations of at least one of the package tool 100, the creator tool 200, or the service tool 300. The instructions may be embodied by or embedded in the processor 1230.

The processor 1230 may retrieve, fetch, or read the instructions from the memory 1210 to execute the instructions. The processor 1230 may write or record one or more results from the execution in the memory 1210 or other memories (not shown), for example, an internal register, an internal cache, and a storage.

When at least one of the package tool 100, the creator tool 200, or the service tool 300 is executed by the processor 1230, the methods or operations described above with reference to FIGS. 1 through 11 may be performed by the processor 1230, and a detailed and repeated description of this is omitted here for increased clarity and conciseness.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A content right management method, comprising:
   receiving contents from an owner of the contents;
   generating a create key, which represents an ownership interest for the contents, by encrypting the contents using encryption information associated with the owner of the contents, wherein the create key includes a copyright of the contents and a creation right of the contents, and wherein the creation right of the contents includes a right to create encrypted contents and a right to create a coin;
   setting a number of copies of encrypted contents and a number of coins to be created for the create key;
   creating the encrypted contents in accordance with the number of copies of encrypted contents and the coin in accordance with the number of coins;
   distributing the encrypted contents to allow users to access the encrypted contents; and
   receiving one or more coins from a user among the users for using the encrypted contents based on information on a usage right option and a period of use of the contents, the information being included in the one or more coins.

2. The content right management method of claim 1, wherein the encryption information is bioinformation of the owner.

3. The content right management method of claim 1, wherein the generating of the create key comprises:
   generating a number of create keys based on a number of owners that share the ownership interest in the contents.

4. The content right management method of claim 1, further comprising:
   transferring the create key,
   wherein, through the transferring, at least one of the copyright of the contents or the creation right of the contents is transferred.

5. The content right management method of claim 4, wherein, when the create key is transferred to a person who is not an inheritor, only the copyright of the contents is transferred.

6. The content right management method of claim 4, when the create key is transferred to an inheritor, further comprising:
   generating a new create key using bioinformation of the inheritor.

7. The content right management method of claim 1, wherein the encrypted contents and the coin are created using bioinformation of the owner.

8. The content right management method of claim 1, further comprising:
   returning the one or more coins to the user based on the information on the usage right option and the period of use of the contents.

9. The content right management method of claim 1, wherein one of the encrypted contents and the coin includes a reproduction program or a reproduction module.

10. The content right management method of claim 1, further comprising:
   storing the create key in a blockchain.

11. The content right management method of claim 1, further comprising:
   storing the encrypted contents in a blockchain.

12. The content right management method of claim 1, further comprising:
   inserting coin log information in a coin among the one or more coins received from the user.

13. The content right management method of claim 12, further comprising:
   storing the coin having the coin log information inserted therein in a blockchain.

14. The content right management method of claim 12, wherein the coin log information is encrypted.

15. The content right management method of claim 1, wherein the contents include a 3D printing model.

16. The content right management method of claim 15, wherein the number of copies of the encrypted contents corresponds to a number of copies that the 3D printing model is allowed to be printed.

\* \* \* \* \*